United States Patent Office 2,949,910
Patented Aug. 23, 1960

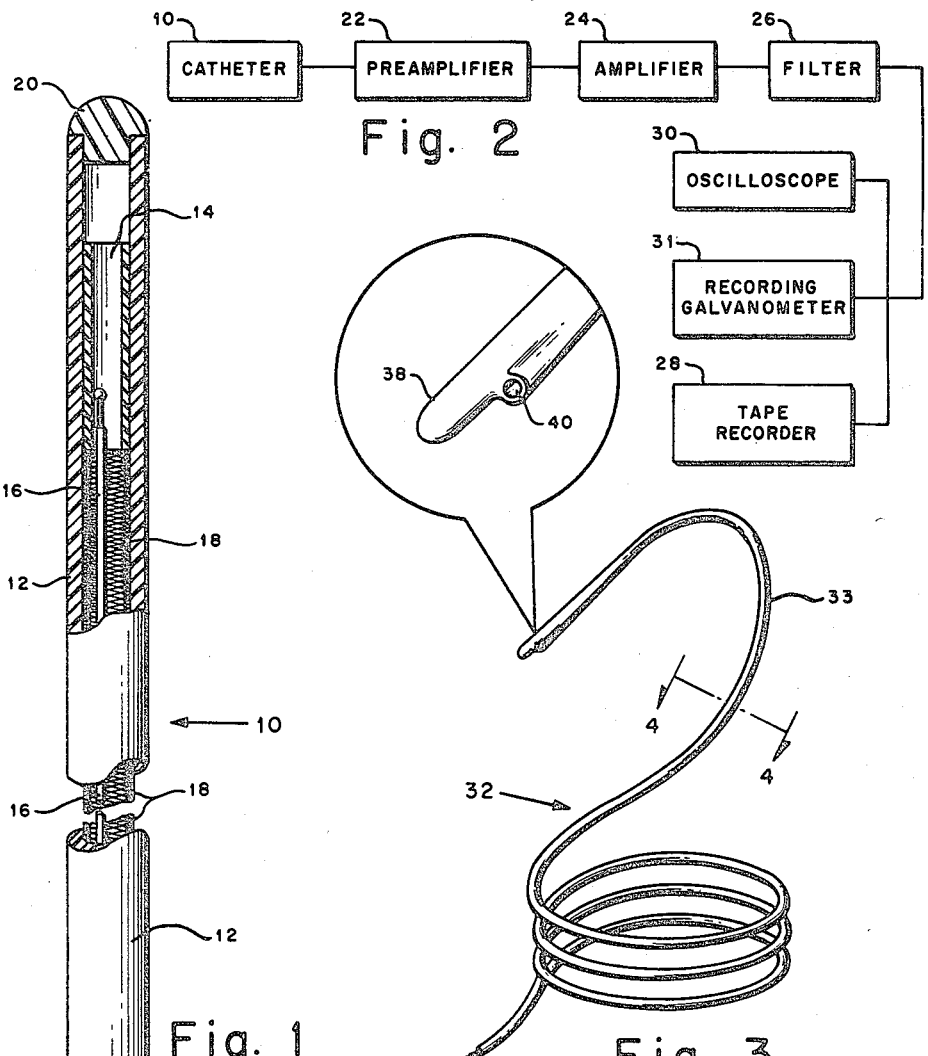

2,949,910

PHONOCARDIAC CATHETER

James R. Brown, 614 Aintree Road, Hatboro, Pa.; John D. Wallace, 313 Burton Road, Oreland, Pa.; and David H. Lewis, 5829 Hoffman Ave., Philadelphia 43, Pa.

Filed Mar. 29, 1957, Ser. No. 649,577

5 Claims. (Cl. 128—2.05)

(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for use in intracardiac phonocardiography and more particularly to a method and apparatus utilizing principles of underwater acoustics in the study and diagnosis of the heart.

The most common technique for monitoring the heart utilizes a stethoscope or microphone against the outside of the chest. Another technique requires that the microphone be placed against the heart itself by major surgery. In addition, there has been some experimentation with the use of a catheter as a means of monitoring the sounds directly within the heart itself. For example, a catheter used by Japanese experimenters included a small condenser microphone which was inserted in a vein and pushed along until it reached the heart.

All of the techniques described above have severe limitations and disadvantages which limit their usefulness. Because the stethoscope and microphone are not placed directly within the heart, the sounds coming therefrom are greatly attenuated and there is great difficulty in identifying the source of each particular sound. The use of the microphone placed against the heart requires major surgery which renders it impractical for widespread use. The condenser hydrophone suggested by the Japanese experimenters has the extreme limitation of using the body and blood as one of the electrodes and in concept is precisely similar to the long line condenser hydrophone developed in the past. The construction of the condenser catheter results in several limitations. First, the frequency response is that of a low pass filter in which the cut-off is probably in the order of 1000 cycles per second. The second and probably most severe limitation is that imposed by using the blood and body as the second electrode. This arrangement results in extreme emphasis of whirlpooling sounds caused by the electrode variation as the blood swirls about the tip. It is only when the tip contacts the inner wall of the heart that vibrations of the solid structure can be obtained.

The present invention overcomes all of the disadvantages described above in connection with the aforementioned techniques by providing a specially designed catheter which may be inserted in a vein or artery and pushed along the vein or artery until it reaches the heart, using a fluoroscope to determine the location of the catheter. The leads from the catheter are introduced into an amplifier and then to some recording instrument such as a tape recording device or recording oscillograph. The catheter tip is specially designed to originate signals indicating the sounds or noise waves emanating from within the heart.

The instant method applies the techniques of underwater acoustics in utilizing a catheter which is capable of transducing the various sounds within the heart. Such a catheter has a low frequency cut-off, of the order of 20 cycles per second and has a useful response well over 100,000 cycles per second.

It is a first object of the present invention to provide an intracardiac catheter utilizing the techniques of underwater acoustics for transducing the various sounds within the heart.

Another object of the present invention is the provision of a catheter or probe having a piezoelectric crystal therein for transducing the sounds in the area where the catheter or probe may be placed.

Another object is to provide a novel miniaturized phonocardiac catheter capable of being moved into the heart intravenously and utilizing principles of underwater acoustics for transducing the various sounds within the heart.

A further object of the invention is the provision of a miniaturized transducing probe utilizing underwater sound techniques in the detection and measurement of sounds within a remote or inaccessible space.

A further object of the invention is the provision of a novel technique or method of monitoring the heart or other vital organ within the human body through the use of the techniques of underwater acoustics.

Still another object is to provide a method of obtaining heart sounds from directly within the heart cavity by the use of a miniaturized catheter having therein a piezoelectric crystal capable of transducing the various sounds within the heart.

Another object is to provide a method of applying the techniques of underwater acoustics for transducing the various sounds within the heart by using a catheter having a piezoelectric crystal therein for intravenously passing said catheter to a point within the chambers of the heart and using a fluoroscope for determining the location of the catheter.

Still another object of the present invention is the provision of a novel method utilizing ultrasonic techniques for determining the size of heart chambers, detecting septal defects therein, determining the extent and character of valvular lesions, mapping of sound transmission in the vascular system, measuring the visco-elastic properties of the arterial wals, and determining the paths which the heart sounds take in coming out to the body surface in order to increase the value of surface listening devices such as the stethoscope and the microphone.

The exact nature of this invention as well as other objects and advantages thereof will be readily apparent from consideration of the following specification relating to the annexed drawing in which:

Fig. 1 shows one preferred embodiment of the catheter;

Fig. 2 shows a typical arrangement for incorporating the catheter of Fig. 1;

Fig. 3 shows an alternate configuration for the novel catheter; and

Fig. 4 is a section along 4—4 of Fig. 3.

In Fig. 1, catheter 10 is constructed of an elongated hollow tubing 12 made of a plastic material which must be completely safe to use in contact with blood and which is chemically inert, completely non-toxic and generally considered safe for surgical and pharmaceutical usage. A typical such material would be Tygon, which is manufactured by the United States Stoneware Company.

For the particular use contemplated of catheter 10, tubing 12 would be of very small outer diameter, typically of the order of $\frac{1}{10}$ of an inch and less, and made sufficiently long to extend to the necessary electronic equipment. Mounted within and near the end of tubing 12 is a transducer element 14 which is generally of cylindrical shape. Element 14 may be made from the activated ferroelectric material barium titanate shown in Patent No. 2,724,171 of John D. Wallace for Activation of Ferroelectrics issued November 22, 1955. Of course, other electro-acoustical pressure transducer elements which have been developed or will be developed in the future may be tested and found useful for the particular element 14 illustrated. For example, magnetostrictive elements constructed of nickel or permendur alloy (49% iron, 49% cobalt, and 2% vanadium), or other ferroelectric crystals, i.e. lead zirconate, lead metaniobate, having piezoelectric properties, may prove useful as the transducer element 14 in particular applications. An insulated electrical conductor 16 and a coaxial grounding cable 18 are connected to the inner and outer surfaces, respectively, of transducer element 14, as is understood in the art, and extend the length of tubing 12. The end of tubing 12 opposite element 14 is sealed by the use of a slug 20 of the plastic material which is then rounded to make a smooth surface. The inside wall of tubing 12 is coated with a liquid material such as silicone oil or castor oil for lubricating said wall thereby permitting transducer element 14 to be inserted and removed with ease. The oil coating serves the additional function of acoustic coupling between the tubing itself and the outer surface of transducer element 14. A liquid material selected for this purpose should have stability and high resistivity in the temperature ranges to be used, should not attack the plastic material forming the tubing, and should have approximately the same acoustic characteristics as the plastic material used in tubing 12.

The catheter described is useful in heart investigations. When used for such purposes, catheter 10 is inserted into the heart by making an opening in a blood vessel at some convenient point such as a forearm. End 20 of tubing 12 is fed slowly into the blood vessel and then passed into the heart. The movement of the catheter 10 is watched by a fluoroscope and the output signal of the catheter may be correlated in any convenient fashion with the location of the transducer element 14. As stated above, cable 18 may be connected to ground while lead 16 is connected, as best shown in Fig. 2, to the input end of pre-amplifier 22, the output of which is fed into an amplifier 24 which produces a suitable output for use in a tape recording device 28, a recording oscillograph 30 of conventional design, and/or a recording galvanometer, after proper filtering by circuit 26.

If it is desired to take blood samples at the same instant that the heart sounds are being monitored, a modified catheter such as the one shown in Fig. 3 may be used. In this arrangement, a double lumen catheter 32 is resorted to. As best shown in Fig. 4, this catheter consists of tubing 33 having a pair of separate passageways 34 and 36 through which the required wiring and blood pass, respectively. Passageway 34 leads into sealed tip 38 containing transducer element 14 and this construction is similar to that illustrated in Fig. 1. Passageway 36 leads to the opening 40 set back from probe tip 38. As is understood in the art, flow of a saline solution is maintained through passageway 36 and opening 40 when a blood sample is not being taken to prevent air from being introduced into the blood vessel. In other words, in using the double lumen catheter, established techniques for taking blood samples from the heart are readily applied to this catheter since the presence of the transducer element within tip 38 does not interfere with blood flow through opening 40. Of course, alternate arrangements of probe tip 38 and opening 40 may be feasible for particular situations.

The catheters herein described make it possible to develop new techniques for the study of the human heart and other vital organs. For example, the instant cateter may be used to determine the size of heart chambers and to detect septal defects. This could be accomplished by causing short burst of high frequency sound waves in the 50 to 100 kilocycle range to be sent from the barium titanate or other transducer crystal mounted in the end of the catheter which is placed in the heart chamber in the manner previously described. In tis case, of course, the catheter is being used as a loudspeaker. By using echo techniques, determination of size of the chamber is made on the basis of delay and time of echo return from the chamber walls. Detection of septal defects is made on the basis of prolongation of time of part of the echo return.

Another method which is made possible by the use of these catheters is that of the determination of the extent and character of valvular lesions. This would be accomplished by listening to sound waves picked up from the catheter tip when the latter is placed near the particular valve within the heart chamber.

An important technique improvement which is made possible by this invention is the greater and more efficient use of the stethoscope and other exterior pick-ups or microphones. By the use of these catheters, it is possible to map out the actual spot origins of the sounds heard on the chest surface. By injecting a predetermined level of sound at various frequencies in several locations within the heart system it is possible to map the chest surface using conventional chest microphones. This technique yields precise information directly applicable to the most used technique today and so further enchances the utility of the stethoscope.

In addition, the transducer device herein described is capable of application to numerous industrial and production applications. One possible use of a probe designed according to the principles of this invention would be as a small hydrophone to monitor moving machine parts in remote and inaccessible places, such as in a gear box for gear noises, the mapping of exhaust fields from hydraulic exhaust models of aerodynamic units, for making studies of the flow in turbines, pipe lines, or other power conversion and transporting equipment, and for making studies of sound and noise problems arising out of the use of noisy machines and equipment. When designed for use as a small transducer, the invention could be used to inject high frequency acoustic radiation in a liquid to permit evaluation of its chemical or physical properties or that of its container.

It is thus seen that there has been provided a novel catheter and method for using same to perform extensive studies and diagnosis of the heart system and which is also capable of application to other problems as hereinabove indicated. However, it should be understood that the foregoing disclosure relates only to preferred embodiments of the invention and that numerous modifications may be made therein without departing from the spirit and the scope of the invention as set forth in the appended claims.

What is claimed is:

1. A phonocatheter for producing and detecting a wide frequency range of sonic and supersonic waves in the cardiovascular system comprising, in combination: a long flexible hollow tube of small outside diameter capable of passing through blood vessels, said tube sealed at the insertion end and constructed of chemically inert material, a short electromechanical transducer located within and acoustically coupled to the side wall of said tube adjacent to said insertion end, said transducer having transmitting and receiving piezoelectric properties responsive to the rate of change of an input signal in the frequency range of approximately 3 to at least 100,000 cycles per second, and a coaxial cable connected to said transducer and extending within and throughout the length of said tube whereby electrical signals can be transmitted to or from said transducer through said cable without significant distortion.

2. A phonocatheter for detecting a wide frequency range of sonic and supersonic waves in the cardiovascular system comprising, in combination: a long flexible hollow tube of small outside diameter capable of passing through blood vessels, said tube sealed at the insertion end and constructed of chemically inert material, a short polarized ferroelectric ceramic transducer located within and accoustically coupled to the side wall of said tube adjacent to said insertion end, said transducer having receiving piezoelectric properties responsive to the rate of change of pressure in the cardiovascular system in the frequency range of approximately 3 to at least 100,000 cycles per second, and a coaxial cable connected to said transducer and extending within and throughout the length of said tube whereby electrical signals can be transmitted from said transducer through said cable without significant distortion.

3. An intracardiac phonocatheter for producing a wide frequency range of sonic and supersonic waves in the heart comprising, in combination: a long flexible hollow tube of small outside diameter capable of passing intravascularly to the heart, said tube sealed at the insertion end and constructed of chemically inert material, a short electromechanical transducer located within and acoustically coupled to the side wall of said tube adjacent to said insertion end, said transducer having transmitting and receiving piezoelectric properties responsive to the rate of change of an input signal in the frequency range of approximately 3 to at least 100,000 cycles per second, and a coaxial cable connected to said transducer and extending within and throughout the length of said tube whereby electrical signals can be transmitted to or from said transducer through said cable without significant distortion.

4. An intracardiac phonocatheter for detecting a wide frequency range of sonic and supersonic waves in the heart comprising, in combination: a long flexible hollow tube of small outside diameter capable of passing intravascularly to the heart, said tube sealed at the insertion end and constructed of chemically inert material, a short polarized ferroelectric ceramic transducer located within and acoustically coupled to the side wall of said tube adjacent to said insertion end, said transducer having receiving piezoelectric properties responsive to the rate of change of pressure in the heart in the frequency range of approximately 3 to at least 100,000 cycles per second, and a coaxial cable connected to said transducer and extending within and throughout the length of said tube whereby electrical signals can be transmitted from said transducer through said cable without significant distortion.

5. An intracardiac phonocatheter as set forth in claim 4 further comprising a separate passage open at both ends and extending throughout the length of said tube.

References Cited in the file of this patent

UNITED STATES PATENTS

| | | |
|---|---|---|
| 2,486,146 | Frondel | Oct. 25, 1949 |
| 2,558,563 | Janssen | Jan. 26, 1951 |
| 2,634,721 | Greenwood | Apr. 14, 1953 |
| 2,763,153 | Simjian | Sept. 18, 1956 |
| 2,787,160 | Valkenburg | Apr. 2, 1957 |
| 2,799,788 | Fitzgerald et al. | July 16, 1957 |
| 2,803,129 | Bradfield | Aug. 20, 1957 |
| 2,812,452 | Harris | Nov. 5, 1957 |
| 2,849,075 | Godbey | Aug. 26, 1958 |

OTHER REFERENCES

"The Lancet," August 20, 1955, page 380. (Copy in Div. 55.)

"Circulation," vol. 5, February 1952, page 257. (Copy in Div. 55.)

Penn State College Paper, "Final Report on Atmospheric Physics," published 1950, pages 19–22 and Figures 1.37–1.38. (Copy in Division 55.)

UNITED STATES PATENT OFFICE
CERTIFICATE OF CORRECTION

Patent No. 2,949,910                                            August 23, 1960

James R. Brown et al.

It is hereby certified that error appears in the printed specification of the above numbered patent requiring correction and that the said Letters Patent should read as corrected below.

Column 2, line 42, for "wals" read -- walls --; column 4, line 1, for "tis" read -- this --; column 5, line 12, after "producing" insert -- and detecting --.

Signed and sealed this 11th day of April 1961.

(SEAL)
Attest:
ERNEST W. SWIDER
Attesting Officer

ARTHUR W. CROCKER
Acting Commissioner of Patents